US009821714B2

(12) United States Patent
Stevens

(10) Patent No.: US 9,821,714 B2
(45) Date of Patent: Nov. 21, 2017

(54) LIGHT ASSEMBLY

(71) Applicant: Richard Stevens, Mehoopany, PA (US)

(72) Inventor: Richard Stevens, Mehoopany, PA (US)

( * ) Notice: Subject to any disclaimer, the term of this patent is extended or adjusted under 35 U.S.C. 154(b) by 0 days.

(21) Appl. No.: 15/297,299

(22) Filed: Oct. 19, 2016

(65) Prior Publication Data
US 2017/0106795 A1   Apr. 20, 2017

Related U.S. Application Data

(60) Provisional application No. 62/243,261, filed on Oct. 19, 2015.

(51) Int. Cl.
B60Q 1/26 (2006.01)
B60Q 9/00 (2006.01)
B60Q 1/00 (2006.01)
F21S 10/06 (2006.01)
B60Q 1/30 (2006.01)
B60Q 1/44 (2006.01)

(52) U.S. Cl.
CPC ........... *B60Q 9/008* (2013.01); *B60Q 1/0076* (2013.01); *B60Q 1/2607* (2013.01); *B60Q 1/30* (2013.01); *B60Q 1/442* (2013.01); *F21S 10/06* (2013.01); *B60Q 2300/116* (2013.01)

(58) Field of Classification Search
CPC .... B60C 1/50; B60C 1/46; B60C 9/00; B60C 9/008; B60C 1/30
USPC ....................................... 340/468–472, 425.5
See application file for complete search history.

(56) References Cited

U.S. PATENT DOCUMENTS

| 1,648,629 | A | * | 11/1927 | Taylor | G08G 1/07 340/914 |
| 2,130,090 | A | * | 9/1938 | Imhofe | B60Q 1/30 296/37.1 |
| 3,873,968 | A | | 3/1975 | Baader | |
| 4,631,516 | A | * | 12/1986 | Clinker | B60Q 1/503 340/464 |
| 4,833,448 | A | | 5/1989 | Chang | |
| 5,299,109 | A | * | 3/1994 | Grondal | G09F 13/08 362/241 |
| 5,604,480 | A | * | 2/1997 | Lamparter | B60Q 1/50 340/433 |
| 5,652,565 | A | * | 7/1997 | Salcedas | B60Q 1/302 340/467 |
| 6,020,814 | A | * | 2/2000 | Robert | B60Q 1/444 307/10.8 |

(Continued)

*Primary Examiner* — Eric M Blount
(74) *Attorney, Agent, or Firm* — Global Intellectual Property Agency, LLC; Jordan Sworen

(57) ABSTRACT

A light assembly for a school bus. The light assembly includes a housing having a front side and a rear side, wherein the rear side is mountable to a school bus. The front side of the housing includes a perimeter light, a stop light, and a platform light, wherein the lights can alert vehicles approaching a stopping school bus. The perimeter light is disposed around a perimeter of the housing and can produce an amber color. The stop light includes the word 'stop' in a non-colored transparent material and the platform light, disposed between the perimeter light and the stop light, can produce a red color. In one embodiment, the light assembly is operably connected to a control, speedometer, and door assembly of a school bus, allowing the light assembly to automatically activate when the school bus stops and automatically deactivate when the school bus door closes.

7 Claims, 4 Drawing Sheets

(56) References Cited

U.S. PATENT DOCUMENTS

| | | | |
|---|---|---|---|
| 7,068,160 B2 | 6/2006 | Tourneur et al. | |
| 7,397,349 B2 | 7/2008 | Lahr et al. | |
| 7,467,486 B2 * | 12/2008 | Kaoh | G09F 13/22 |
| | | | 40/551 |
| 8,698,610 B2 * | 4/2014 | Krugh, IV | B60Q 1/32 |
| | | | 340/433 |
| 9,153,150 B2 * | 10/2015 | Fallon | G09F 13/0404 |
| D768,242 S * | 10/2016 | Fallon | D20/42 |
| 9,589,486 B2 * | 3/2017 | Haddad | G09F 13/18 |
| 2006/0226964 A1 | 10/2006 | Riesebosch | |
| 2007/0103922 A1 * | 5/2007 | Rissmiller | B60Q 1/50 |
| | | | 362/499 |

\* cited by examiner

US 9,821,714 B2

LIGHT ASSEMBLY

CROSS REFERENCE TO RELATED APPLICATION

This application claims the benefit of U.S. Provisional Application No. 62/243,261 filed on Oct. 19, 2015. The above identified patent application is herein incorporated by reference in its entirety to provide continuity of disclosure.

BACKGROUND OF THE INVENTION

The present invention relates to light assemblies. More specifically, the present invention provides a light assembly having the word 'stop' positioned thereon and flashing amber and red lights configured to alert vehicles approaching a school bus that is picking up or dropping off children.

School buses often make frequent stops in the morning and in the afternoon when picking up and dropping off children. Conventional school buses have brake lights, flashers, and an integral stop sign, but sometimes these are not enough to alert drivers of approaching vehicles. In some circumstances, some drivers may not understand or be alerted to the requirement to stop for school buses when picking up or dropping off children. These drivers will choose to drive around the school bus or will not be able to stop in time and hit the bus. These situations are very dangerous for children having to cross a street or children sitting on the bus. Therefore, there exists a need for a light assembly that can more effectively alert drivers in advance that the school bus is going to stop and notify drivers of their requirement to stop.

Devices have been disclosed in the known art that relate to light assemblies. These include devices that have been patented and published in patent application publications. These devices generally relate to flashing red and amber lights. These devices have several known drawbacks. These devices fail to provide a lighting feature with an outer amber perimeter, and an inner portion comprising red lighting with the word 'stop', whereby the lights activate and deactivate with the stopping of the school bus and the closing of the school bus door.

In light of the devices disclosed in the known art, it is submitted that the present invention substantially diverges in design elements from the known art and consequently it is clear that there is a need in the art for an improvement to existing light assemblies. In this regard the instant invention substantially fulfills these needs.

SUMMARY OF THE INVENTION

In view of the foregoing disadvantages inherent in the known types of light assemblies now present in the prior art, the present invention provides a new light assembly wherein the same can be utilized for providing convenience for the user when safely picking up and dropping off children from a school bus.

It is therefore an object of the present invention to provide a new and improved light assembly that has all of the advantages of the prior art and none of the disadvantages. The light assembly comprises a housing having a front side and a rear side, wherein the rear side is configured to mount to a school bus. The front side of the housing comprises a perimeter light, a stop light, and a platform light, wherein all three lights operate to alert vehicles approaching a stopping or stopped school bus. The perimeter light is disposed around a perimeter of the housing and is adapted to produce an amber color. The stop light comprises a word 'stop' in a non-colored transparent material. The platform light is disposed between the perimeter light and the stop light, wherein the platform light is adapted to produce a red color. In one embodiment, the light assembly is operably connected to a control, speedometer, and door assembly of a school bus, allowing the light assembly to automatically activate when the school bus stops and automatically deactivate when the bus door closes. The perimeter light is manually controllable via the control.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
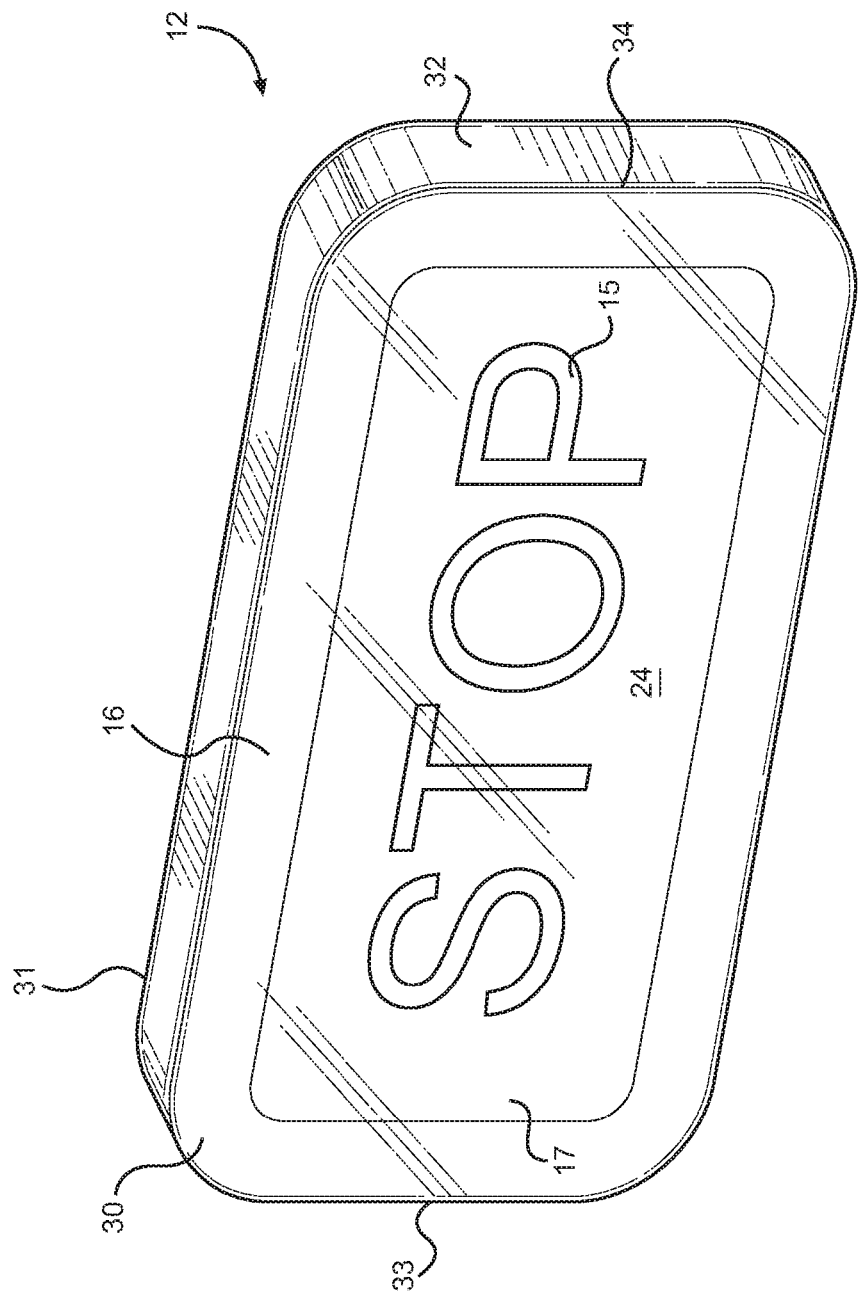
FIG. 1 shows a perspective view of an embodiment of the light assembly.

Reference is made herein to the attached drawings. Like reference numerals are used throughout the drawings to depict like or similar elements of the light assembly. For the purposes of presenting a brief and clear description of the present invention, the preferred embodiment will be discussed as used for safely picking up and dropping off children from a school bus. The figures are intended for representative purposes only and should not be considered to be limiting in any respect.

Referring now to FIG. 1, there is shown a perspective view of an embodiment of the light assembly. The light assembly comprises a housing 12 having a front side 30 and a rear side 31, wherein the rear side 31 is configured to mount to a school bus. The light assembly is configured to connect to wiring used for existing caution and warning lights on a school bus. In the illustrated embodiment, the housing 12 comprises a rectangular cross section. However, in alternate embodiments, the housing 12 comprises any suitably shaped cross section, such as an oval or a square. The front side 30 of the housing 12 comprises a perimeter light 16, a stop light 15, and a platform light 17, wherein all three lights 15, 16, 17 operate to alert vehicles that they are approaching a stopping or stopped school bus. In the illustrated embodiment, the upper surface 24 of each of the perimeter light 16, the stop light, and the platform light 17 are flush with one another so as to form a planar upper surface 24. An interior volume of the housing 12 comprises a control circuit and light sources for the lights 15, 16, 17.

The perimeter light 16 is disposed around a perimeter 32 of the housing 12 and is adapted to produce an amber color. In the illustrated embodiment, the exterior of the perimeter 32 of the housing 12, defining the exterior of the perimeter light 16, comprises an amber colored material such that a light source disposed within the housing 12 illuminates and produces an amber color when viewed from the exterior. In alternate embodiments, the housing 12 comprises an amber colored light source that illuminates the perimeter 32 of the housing 12. The perimeter light 16 is configured to illuminate and flash in order to alert approaching vehicles that the school bus is approaching a pick up or drop off point.

The stop light 15 comprises a four character word 'stop' to directly inform an approaching vehicle of what the vehicle is required to do, which is stop for a school bus picking up or dropping off children. In the illustrated embodiment, the word is centrally located between the lateral sides 33, 34 of the housing 12 in a non-colored transparent material. In this way, the letters spelling the word 'stop' appear white when the stop light 15 is illuminated.

The platform light 17 is disposed between the perimeter light 16 and the stop light 15, wherein the platform light 17 is adapted to produce a red color. In the illustrated embodiment, the platform light 17 covers the entire space between the stop light 15 and the perimeter light 16. In the illustrated embodiment, the upper surface 24 of the platform light 17 is composed of a red material such that when a light source is illuminated from within the housing 12 the platform light 17 appears as a red color. The platform light 17 is configured to flash simultaneously with the stop light 15 so as to provide emphasis to the word stop.

Figure 2:
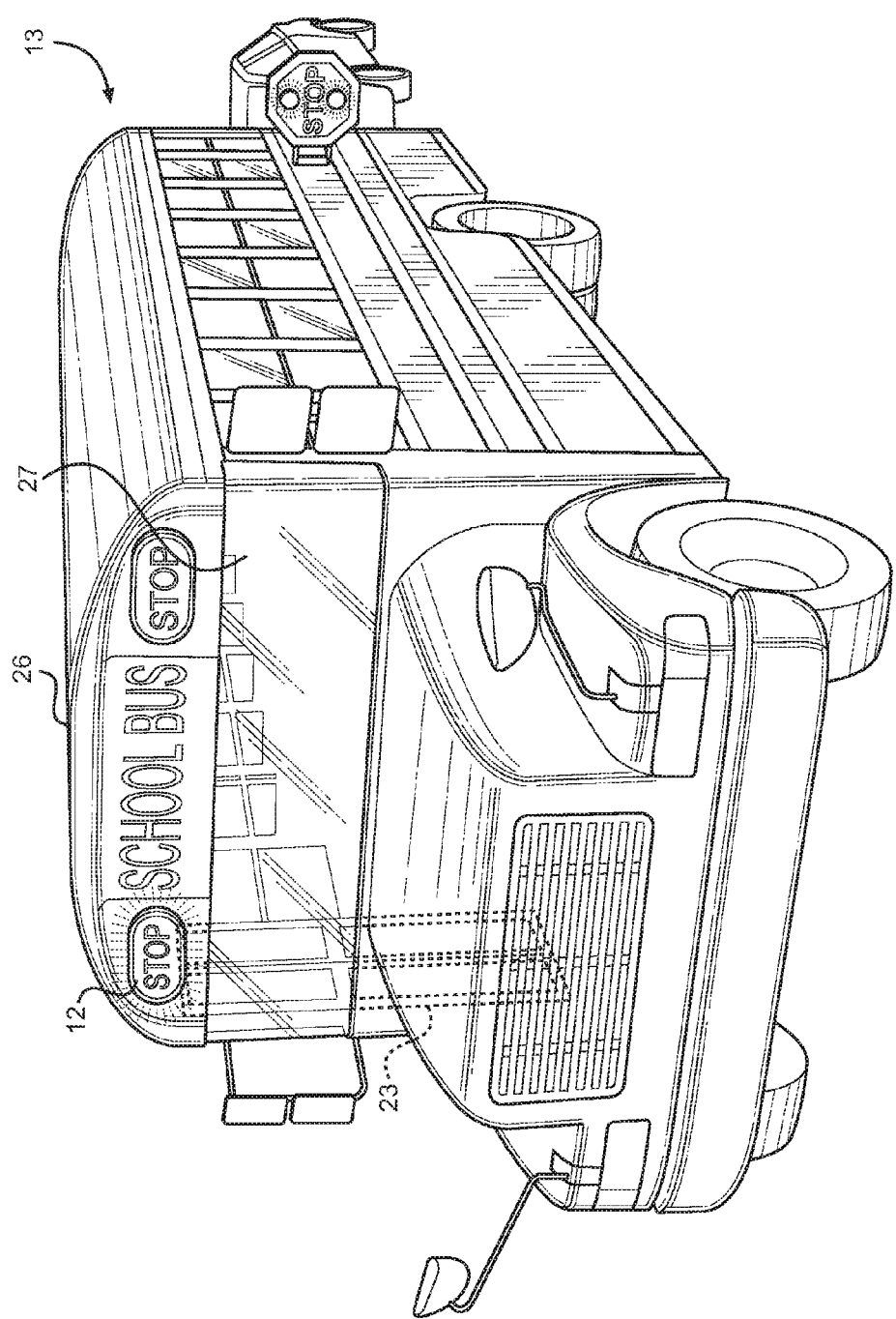
FIG. 2 shows a perspective view of the housing and lights attached to the front of a school bus.
Figure 3:
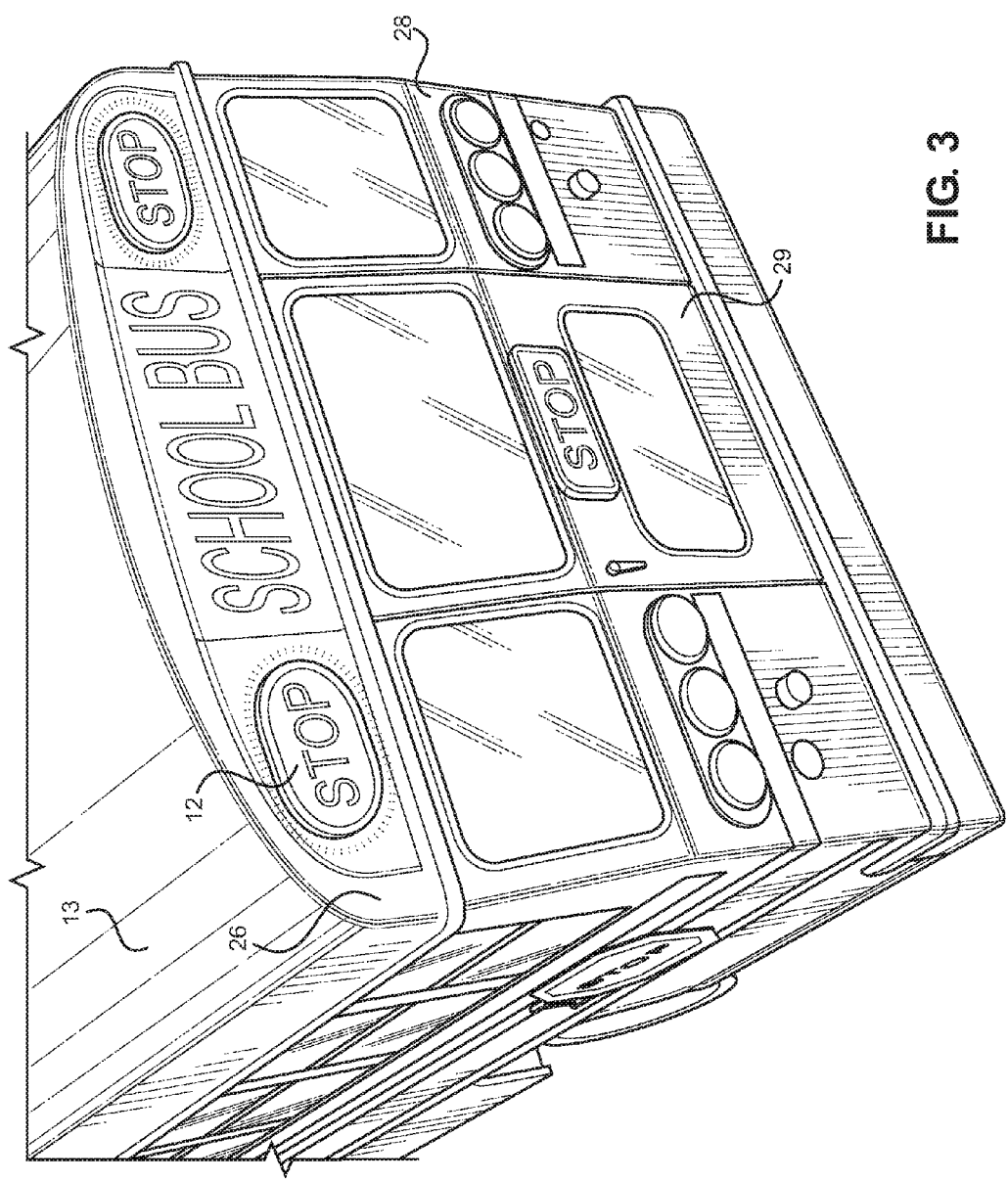
FIG. 3 shows a perspective view of the housing and lights attached to the rear of a school bus.

Referring now to FIGS. 2 and 3, there is shown a perspective view of the housing and lights attached to the front of a school bus and a perspective view of the housing and lights attached to the rear of a school bus, respectively. In the illustrated embodiment, the light assembly includes the school bus 13, wherein the housing 12 is secured to the exterior of the school bus 13. In the illustrated embodiment, there are four housings 12 placed around the upper end 26 of the school bus 13, wherein two are located on the front side 27 and two are located on the rear side 28. The four housings 12 are adapted to replace the caution and warning lights on an existing school bus and are operably connected to existing wiring previously used to operate the caution and warning lights. In some embodiments, a fifth housing 12 is positioned on the emergency door 29 located on the rear side 28 of the school bus 13.

Figure 4:
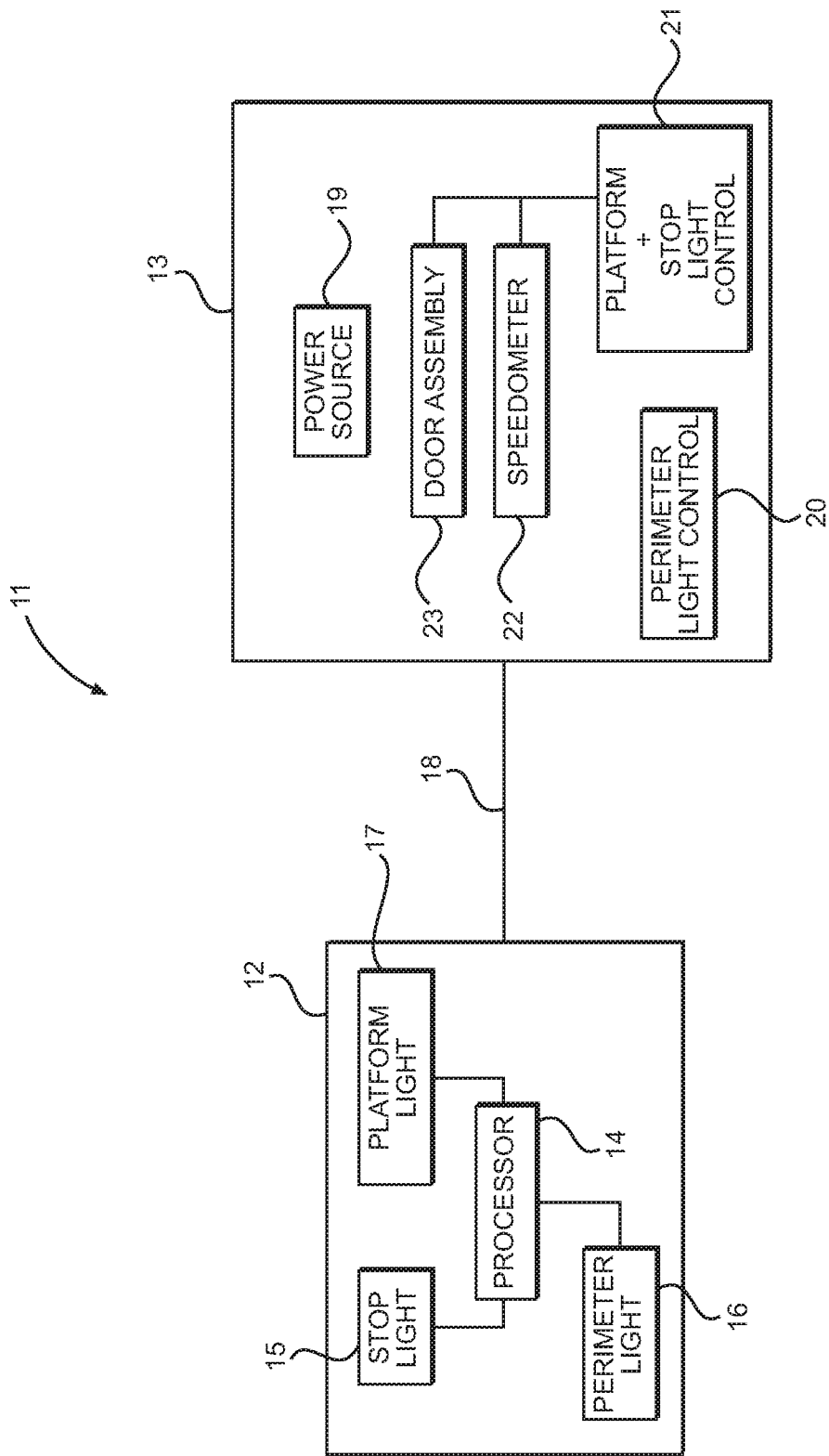
FIG. 4 shows a diagram of the control circuit of the light assembly.

Referring now to FIG. 4, there is shown a diagram of the control circuit of the light assembly. The light assembly 11 further comprises a control circuit configured to automatically and manually allow a user to operate the lights 15, 16, 17 in the housing 12. In one embodiment, the stop light 15, perimeter light 16, and platform light 17 of the light assembly 11 are each operably connected to a processor 14 positioned within the housing 12. The processor 14 executes commands received by a perimeter light control 20 or a platform and stop light control 21. In the illustrated embodiment, controls 20, 21 are electrically connected 18 to the lights 15, 16, 17 and the processor 14. In other embodiments, the controls 20, 21 are wirelessly connected to the lights 15, 16, 17 and the processor 14. Further, the processor 14 is configured to flash the perimeter light 16, the stop light 15, and the platform light 17. In one embodiment, the stop light 15 and platform light 17 are configured to flash simultaneously. In the illustrated embodiment, the controls 20, 21 are mounted on a school bus driver's control panel of the school bus 13 so as to be easily accessed by the user. The perimeter light control 20 comprises an on/off switch that allows a user to manually activate the perimeter light 16. In the illustrated embodiment, the lights 15, 16, 17 and controls 20, 21 are operably connected to and powered by a power source 19 disposed within the school bus, such as the engine battery.

In an alternate embodiment, the rear side of the housing comprises a power cord adapted to be connected to a vehicle power source input, such as a cigarette lighter. The rear side further includes one or more fasteners, such as magnets. In this way, the housing of the light assembly can be removably attached to other vehicles via the fasteners. This allows a driver of a disabled vehicle or a driver assisting a disabled vehicle to warn approaching traffic. In operation, the power cord is plugged into a vehicle's cigarette lighter so as to power the lights of the light assembly.

In the illustrated embodiment, the platform light 17 and the stop light 15 are operably connected to a door assembly 23 and a speedometer 22 of the school bus 13 via the platform and stop light control 21. In the illustrated embodiment, the stop light 15 and platform light 17 are configured to activate upon the speedometer 22 reading zero miles per hour and deactivate upon the detection of the door assembly 23 closing. In this way, the light assembly 11 is able to automatically activate when the school bus 13 stops and automatically deactivate when the school bus door assembly 23 closes. In alternate embodiments, the platform and stop light control 21 comprises an on/off switch that allows a user to manually activate the platform light and stop light.

In operation, a user or school bus driver activates the perimeter light 16 via the on/off switch of the perimeter light control 20 when he or she is within a predetermined distance from a drop off or pick up point, such as 150 feet. Upon activation the perimeter light control 20, the perimeter light 16 activates and produces a flashing amber colored light around the perimeter of the housing 12, at the upper end of the front and rear sides of the school bus 13. The flashing amber colored perimeter light 16 warns a driver of an approaching vehicle to slow down and use caution because children will be crossing the street. The school bus 13 comes to a complete stop in front of the drop off and pick up point, such that the speedometer 22 reads zero miles per hour. Once the speedometer 22 reads zero miles per hour, the stop light 15 and platform light 17 of the housing 12 automatically flash in unison. Alternatively, the user may switch the platform and stop light control 21 to a manual operation, such that the user can manually activate the platform and stop lights 15, 17 if the driver of the school bus has to wait for children to arrive at the pick up point. Once the children have been dropped off or picked up, the door assembly 23 located on the side of the bus will close. Upon closing of the door assembly 23, the platform light 17 and stop light 15 will automatically deactivate.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A light assembly, comprising:
   a housing having a front side and a rear side, wherein the rear side is configured to mount to a school bus;
   a perimeter light disposed around a perimeter of the housing, wherein the perimeter light is configured to produce an amber color;
   a stop light disposed on the housing, wherein the stop light comprises the word 'stop' in a non-colored transparent material;
   a platform light disposed between the perimeter light and the stop light, wherein the platform light produces a red color;
   wherein the light assembly is operably connected to a control, wherein the control is adapted to be installed within the school bus.

2. The light assembly of claim 1, wherein the perimeter light comprises an amber colored transparent material, the stop light comprises a non-colored transparent material, and the platform light comprises a red colored transparent material.

3. The light assembly of claim 1, wherein an upper surface of each of the perimeter light, the stop light, and the platform light are flush with one another.

4. The light assembly of claim 1, wherein the stop light and platform light are operably connected to a speedometer of the school bus, wherein the stop light and platform light are configured to activate upon the speedometer reading zero miles per hour.

5. The light assembly of claim 1, wherein the stop light and platform light are operably connected to a door assembly of the school bus, wherein the stop light and platform light are configured to deactivate upon a closing of the door assembly.

6. A method of activating and deactivating a light assembly when secured to a school bus, comprising:
   activating a perimeter light of a light assembly via a perimeter light control installed in a school bus, when the school bus is within a predetermined distance from a school bus stop;
   producing an flashing amber light from the perimeter light, wherein the perimeter light is disposed around a perimeter of a housing;
   deactivating the perimeter light;
   activating a stop light and a platform light of the light assembly via a perimeter and stop light control, wherein the stop light and platform light automatically flash in unison;
   if a door assembly of the school bus is in a closed configuration, then deactivating the stop light and platform light assembly via the perimeter and stop light control.

7. The method of activating and deactivating a light assembly when secured to a school bus of claim 6, comprising:
   deactivating the perimeter light if a speedometer of the school bus reads zero miles per hour.

* * * * *